US012121978B2

(12) United States Patent
 Pink

(10) Patent No.: US 12,121,978 B2
(45) Date of Patent: Oct. 22, 2024

(54) CUTTING CROWN MOUNTING

(71) Applicant: VECOPLAN AG, Bad Marienberg (DE)

(72) Inventor: Florian Pink, Stockhausen-Illfurth (DE)

(73) Assignee: VECOPLAN AG, Bad Marienberg (DE)

( * ) Notice: Subject to any disclaimer, the term of this patent is extended or adjusted under 35 U.S.C. 154(b) by 549 days.

(21) Appl. No.: 17/446,467

(22) Filed: Aug. 31, 2021

(65) Prior Publication Data
 US 2022/0063002 A1   Mar. 3, 2022

(30) Foreign Application Priority Data
 Aug. 31, 2020 (DE) ...................... 10 2020 122 655.1

(51) Int. Cl.
 *B23B 27/16* (2006.01)
 *B23B 41/06* (2006.01)
 (Continued)

(52) U.S. Cl.
 CPC .......... *B23B 27/1622* (2013.01); *B23B 41/06* (2013.01); *B23B 2200/083* (2013.01); *B23B 2200/3618* (2013.01); *B23B 2205/04* (2013.01)

(58) Field of Classification Search
 CPC ..... B02C 18/16; B02C 18/18; B02C 18/0084; B23B 27/1622; B23B 2205/04
 See application file for complete search history.

(56) References Cited

U.S. PATENT DOCUMENTS 4,709,737 A   12/1987 Jonsson
5,644,965 A    7/1997 MacLennan et al.
(Continued)

FOREIGN PATENT DOCUMENTS

DE   202015107131   3/2016
WO   2005030447    4/2005

*Primary Examiner* — Mohammed S. Alawadi
(74) *Attorney, Agent, or Firm* — Grossman, Tucker, Perreault & Pfleger, PLLC

(57) ABSTRACT

A cutting crown fixing for positively locking and non-rotatable fixing of a cutting crown to a holder associated therewith of a comminuting apparatus, in particular a rotor of a comminuting apparatus, including a cutting crown, a cutting crown holder associated with the cutting crown, a screw bolt and a thread insert having a head portion and a shaft portion, wherein the thread insert has a female thread complementary to the male thread of the screw bolt and the cutting crown holder has a through passage for receiving the screw bolt, and in the installed position the thread insert is arranged in positively locking relationship in the axial and tangential direction in a holding opening of the cutting crown associated therewith. The cutting crown holder according to the invention is distinguished in that the positively locking configuration of a peripheral surface of the thread insert relative to the holding opening of the associated cutting crown extends over the entire longitudinal extent of the thread insert, wherein the thread insert is of a rotationally symmetrical configuration over the longitudinal extent of the head portion for providing an axial positively locking relationship with the holding opening and at least over a longitudinal portion has a conical peripheral surface which in the installed position corresponds to a conical receiving portion of complementary configuration of the holding opening and the thread insert in the region of the longitudinal extent of the shaft portion is of a non-rotationally symmetrical configuration for providing a rotational positively locking relationship with the holding opening.

13 Claims, 3 Drawing Sheets

(51) Int. Cl.
*F16B 5/02* (2006.01)
*F16B 5/06* (2006.01)
*F16B 33/00* (2006.01)
*F16B 37/12* (2006.01)

(56) References Cited

U.S. PATENT DOCUMENTS

2015/0360385 A1* 12/2015 Shaver .................... B27B 33/02
  83/843
2017/0203302 A1* 7/2017 Fredsall .................. B02C 13/06
2017/0232444 A1* 8/2017 Lipowski .............. B02C 18/145
  241/292.1
2021/0346893 A1* 11/2021 Schoepp ............... B02C 18/145

* cited by examiner

CUTTING CROWN MOUNTING

FIELD

The invention concerns a cutting crown fixing for positively locking and non-rotatable fixing of a cutting crown to a holder associated therewith of a comminuting apparatus, in particular a rotor of a comminuting apparatus, including a cutting crown, a cutting crown holder associated with the cutting crown, a screw bolt and a thread insert having a head portion and a shaft portion, wherein the thread insert has a female thread complementary to the male thread of the screw bolt and the cutting crown holder has a through passage for receiving the screw bolt, and in the installed position the thread insert is arranged in positively locking relationship in the axial and tangential direction, the latter also referred to as the peripheral direction, in a holding opening of the cutting crown associated therewith.

BACKGROUND

Cutting crown fixings of that kind are used for example in comminuting or shredding apparatuses in waste disposal, the recycling industry or in the field of processing production waste, in particular for comminuting wood, plastic or refuse, and in addition also in tools like for example peeling machines, planes and so forth for processing surfaces of articles. Depending on the respective design configuration involved in general cutting crown holders of such cutting crown fixings are fixed to a comminuting rotor, for example non-releasably by means of welding or releasably by means of a screw connection, or are welded or shaped in terminal relationship on a rotatably arranged peeling arm, wherein a respective screw bolt extending through the cutting crown holder can be screwed through the cutting crown into a thread insert which, starting from the cutting side of the cutting crown, is fitted into a holding opening in the cutting crown so that the cutting crown is held to the cutting crown holder. A cutting crown fixing of the general kind set forth is disclosed for example in laid-open application WO 2005/030447 A1. The provision of a thread insert for fixing the cutting crown to the cutting crown holder eliminates the need for cutting a thread in the cutting crown itself. As the cutting crown is generally produced from a brittle material or is hardened after the shaping operation to increase the stability such a fixing thread which is also known in the state of the art in the cutting crown results in increased susceptibility to fracture of the cutting crown by virtue of the increased notching effect.

Basically, the design configuration of cutting crown fixings involves the demand for a high level of material resistance or stability of the cutting crown, good securing of the cutting crown in relation to torsional operating forces which can lead to twisting relative to the cutting crown holder or the rotor, securely carrying axial forces to provide a cutting crown fixing and easy interchangeability of the cutting crown in the event of wear or damage.

In the cutting crown fixing of the general kind set forth as disclosed in WO 2005/030447 A1 the cutting crown is fixed to a holding device which is formed at the end on a peeling arm, wherein a thread insert forms with its head portion a positively locking connection in the axial and tangential direction with the holding opening in the cutting crown, into which the thread insert is inserted. In that case a screw bolt is screwed into the thread insert through a passage in the holding device or cutting crown holder, whereby the cutting crown is pressed against the cutting crown holding device. Torsional and axial forces which occur are carried by the head portion of the thread insert, which is fitted in positively locking relationship into the holding opening, and transmitted into the material of the cutting crown.

In the above-described cutting crown fixing of the general kind set forth, using a thread insert, both axial holding forces and/or axial operating forces as well as operating forces occurring in the tangential direction, that is to say the peripheral direction, are transmitted to the cutting crown by way of the head portion of the thread insert. Depending on the respective design configuration of the head portion and the corresponding complementary configuration of the holding opening in the cutting crown head cross-sections of the thread insert, which have corners, in relation to a complementary configuration of the holding opening in the cutting crown, entail a severe notching action in that longitudinal portion, which can result in material fractures in the cutting crown in those regions.

The object of the invention is to provide a cutting crown fixing in which the cutting crown is replaceable, wherein the fixing permits a higher loading of the cutting crowns in comparison with conventional cutting crown fixings without the novel configuration of the cutting crown fixings according to the invention entailing an increased failure rate, in particular linked to a severe notching effect in the region of the holding opening in the cutting crown.

SUMMARY

The present invention attains that object by a cutting crown fixing. The cutting crown fixing according to the invention for positively lockingly and non-rotatably fixing a cutting crown to a holder associated therewith of a comminuting apparatus, in particular a rotor of a comminuting apparatus, includes a cutting crown, a cutting crown holder associated with the cutting crown, a screw bolt and a thread insert having a head portion and a shaft portion axially adjoining same, wherein the thread insert has a female thread which is complementary or adapted to the male thread of the screw bolt and the cutting crown holder has a passage for receiving the screw bolt, and in the installed position the thread insert is arranged or inserted in positively locking relationship in the axial and tangential direction, in particular starting from the cutting side of the cutting crown, in a holding opening in the cutting crown associated therewith. The cutting crown fixing according to the invention is distinguished in that the positively locking configuration of an external peripheral surface of the thread insert relative to the holding opening in the associated cutting crown extends substantially over the entire longitudinal extent of the thread insert, at least over 70%, in particular at least over 80%, wherein the thread insert or its outer defining surface is of a rotationally symmetrical configuration over the longitudinal extent of its head portion to provide an axial positively locking relationship with the holding opening, and at least over a longitudinal portion has a conical peripheral surface which in the installed position corresponds to a conical receiving portion of complementary configuration of the holding opening and the thread insert in the region of the longitudinal extent of the shaft portion, in particular substantially over the entire longitudinal extent of the shaft portion, is of a non-rotationally symmetrical configuration to provide a positively locking relationship in the peripheral direction, that is to say the tangential direction relative to the holding opening. Such a positively locking relationship in the tangential direction or in the peripheral direction is also referred to in the field as a rotational positively locking relationship.

In an embodiment the cutting crown fixing according to the invention is based on the fundamental idea, when using a thread insert in a holding opening in the cutting crown for fixing same to a cutting crown holder, of designing the head of the thread insert alone for providing an axial positively locking relationship between the thread insert and the cutting crown and in addition designing or providing the shaft of the thread insert to provide a rotational positively locking relationship in the sense of rotational locking as between the cutting crown and the thread insert, and designing respective associated longitudinal portions of the holding opening of the cutting crown in corresponding, that is to say complementary fashion. With that procedure the occurrence of notching forces in the longitudinal region of the holding opening in the cutting crown, with which the head portion of the thread insert is associated, is substantially prevented as the holding opening in that portion is of a rotationally symmetrical configuration and substantially pressure forces in that longitudinal portion of the cutting crown are transmitted thereto by way of the head. In contrast the cutting crown fixing according to the invention can be adapted to transmit tangential forces or peripheral forces which occur by way of a positively locking connection of the cutting crown to the thread insert in the axial region of the shaft of the thread insert, with a corresponding complementary configuration of the holding opening of the cutting crown in the associated longitudinal portion. The described separation of the positively locking portions between thread insert and cutting crown to provide an axial and a rotational positively locking relationship between those components has on the one hand the advantage that comparatively low notching forces occur in the region of the cutting surface of the cutting crown while operational forces occurring in the tangential direction can be transmitted to the cutting crown over a large area, preferably over the entire longitudinal extent of the thread insert. In that respect the cutting crown fixing according to the invention results in a greater service life for the cutting crown, and that can substantially reduce the maintenance expenditure for a corresponding comminuting apparatus.

The term "cutting crown" can generally mean a cutting tool for a comminuting or shredding apparatus, in particular a plate-shaped or approximately cuboidal cutting tool. Such a cutting crown can be fixed to a rotor of a comminuting apparatus in particular by means of the cutting crown holder.

The term "head" of the thread insert can mean a longitudinal portion of the thread insert, that in the installed position faces towards the cutting side and/or a cutting edge of the cutting crown or faces away from the cutting crown holder. That head of the thread insert can be distinguished in that, at least in a longitudinal portion, in particular over its entire longitudinal extent, it is of a greater radial extent than the shaft portion of the thread insert.

The reference to axial, tangential and radial direction can relate in the installed position of the components of the cutting crown fixing, to the axis of the screw bolt or an axis of a passage in the thread insert, that is provided with a thread for the screw bolt, that is to say the axis of the thread of the thread insert.

The conical peripheral surface which is provided over at least a longitudinal portion of the head of the thread insert can be of such orientation and configuration that the radial extent thereof narrows in the axial direction relative to the shaft of the thread insert.

Further features according to the invention and developments of the invention are set forth in the general description, the Figures, the specific description of the drawings and the appendant claims.

To optimize the transmission of tangential, that is to say rotational and axial operating forces between the cutting crown and the thread insert it can desirably be provided that the holding opening extends from a surface, in particular a cutting surface of the cutting crown, to a surface opposite thereto. In that way the above-described positively locking relationship between the cutting crown and the thread insert can be provided over the entire longitudinal extent of the cutting crown in the installed position to maximize the contact surfaces of the cutting crown, that provide the described positively locking engagement and fix the said holding opening to the peripheral surface of the thread insert to minimize a respective loading in relation to area.

For further improved diversion of axial holding and operating forces acting on the cutting crowns, to the thread inserts in the region of the cutting surface or surfaces thereof, it can desirably be provided that the head portion of the thread insert in the longitudinal direction has a cylindrical portion or outer peripheral surface portion which in the installed position faces towards the cutting surface of the cutting crown and which can be adjoined in coaxial orientation by the conical portion of the head portion of the thread insert. In a particularly desirable embodiment it can be provided that the outer peripheral surface of the head portion of the thread insert has solely the cylindrical portion facing towards the cutting surface of the cutting crown and a single conical portion axially adjoining same.

It can preferably be provided that the conical longitudinal portion of the head of the thread insert has a radial taper in the direction towards the shaft of the thread insert, wherein the taper in diameter in relation to the maximum diameter of the head portion can be at least 20%, in particular at least 25%, preferably at least 30%.

It can be provided that the longitudinal extent of the head portion of the thread insert is at least 30%, in particular at least 35% of the overall longitudinal extent of the thread insert.

In regard to the configuration of the cutting crown fixing according to the invention it can be provided that the thread insert in the peripheral direction in the region of its shaft has a variable spacing of its outer peripheral surface perpendicularly to the axis of its screw thread, to constitute the described non-rotationally symmetrical outer peripheral surface of the shaft portion. Such a configuration can lead to the production of predetermined force transmission profiles and the formation of a rotational positively locking relationship of the thread insert, in particular in the region of its shaft, with respect to the cutting crown, by corresponding complementary configuration of the holding opening of the cutting crown with respect to the outer peripheral surface of the shaft of the thread insert.

In an embodiment of the thread insert of a cutting crown fixing according to the invention the positively locking configuration of the shaft region of the thread insert in cross-section can at least portion-wise be of a polygonal shape, in particular a closed polygonal shape, in which respect connecting corners can be at least partially rounded, whereby a notching effect at portions of a complementary configuration of the regions of the cutting crown, that provide the holding opening, can be minimized. As described it can basically be provided that the positively locking configuration between the shaft portion of the thread insert and the associated portions, which are at least portion-wise of a complementary configuration, of the holding opening of the cutting crown are designed solely to provide a rotational positively locking relationship within that longitudinal portion of the cutting crown.

It is to be noted that the terms "polygonal" or "polygon shape" are to be interpreted broadly and in particular also include lines which are not straight but curved. By way of example the outer peripheral surface of the shaft can be composed of a plurality of curved surface portions which occur in succession in the peripheral direction, in which case straight or flat surface portions can also be embraced. As those successive peripheral surfaces can be of differing radii of curvature that results in a rotational positively locking relationship with the associated longitudinal portion, that is of a complementary configuration to the peripheral surface of the shaft, of the holding opening of the cutting crown.

It can also be provided that, within the shaft portion of the thread insert, besides a rotational positively locking relationship, there is also an axial positively locking relationship with portions of a complementary configuration of the holding opening of the cutting crown in order further to reduce the loading in relation to area in the axial direction. In that respect in terms of the design configuration of the cutting crown fixing according to the invention it can be provided that along the longitudinal extent of its shaft portion the thread insert has a variable spacing in respect of its peripheral surface perpendicularly to the axis of its screw thread. Besides the provision of a rotational positively locking relationship of the thread insert in the region of its shaft with respect to the cutting crown such a configuration can lead to the additional formation of an axial positively locking relationship of the thread insert in the region of its shaft.

As illustrated however it can also be provided that in the installed position in the longitudinal extent of its shaft the thread insert is free of positively locking engagement in the axial direction relative to associated portions of the holding opening so that the two axially successive regions which are different in their positively locking function of the head portion and the shaft portion of the thread insert as well as the respectively associated regions of a complementary configuration of the holding opening in the cutting crown can each be of an optimized configuration, in particular in relation to a reduced notching effect in the material of the cutting crown and in relation to an optimized configuration for providing the axial and rotational positively locking relationship between the thread insert and the cutting crown.

It can be provided that the cutting crown fixing according to the invention is so adapted that the thread insert in the installed position is arranged or is inserted in fixed relationship for example by means of clamping, producing a press fit, staking or gluing in the holding opening of the cutting crown to avoid relative movement between the cutting crown and the thread insert and/or to facilitate assembly. As an alternative it can also be provided that in the installed position the thread insert is fitted in the holding opening in the cutting crown loosely and axially removeably after release of the fixing screw.

In order to reduce operating forces which possibly occur at a cutting surface of the cutting crown in the region of the holding opening it can desirably be provided that in the installed position at a front end portion facing at least towards a cutting surface of the associated cutting crown the thread insert has an end face which continuously extends and/or supplements a cutting surface of the cutting crown, in particular without a sudden change or smoothly. Besides avoiding operating forces which under some circumstances reduce the service life of the cutting crown that measure can also produce the sectional image of a cutting crown with a substantially continuous cutting surface.

A substantially completely continuous cutting surface can be afforded in those embodiments in which the screw bolt of the cutting crown fixing according to the invention, in the installed position, at a front end portion facing towards a cutting surface of the associated cutting crown, has an end face or head face which continuously extends and/or supplements the end face of the thread insert and therewith the cutting surface of the cutting crown to optimize chip guidance.

It can be provided that, in a cutting crown fixing according to the invention, the female thread of the thread insert, that is complementary to the screw bolt, is in the form of a blind hole thread whereby the ingress of dirt or moisture into the female thread of the thread insert from the cutting side of the cutting crown is prevented and the end face of the thread insert in the installed position can be in the form of an extension of a cutting surface of the cutting crown so that this can provide a continuous cutting surface of the cutting crown by virtue of a suitable surface configuration of the end of the thread insert to optimize chip guidance.

In an advantageous embodiment of the cutting crown fixing according to the invention the thread insert and the associated cutting crown can be formed from mutually different materials, wherein the material of the thread insert can have a ductility which is at least 50% higher, in particular at least twice as high, as the material of the cutting crown. A higher level of ductility of the material used for the thread insert means that operating forces which occur and which are outside the specification of the cutting crown can be absorbed by deformation of the thread insert without the cutting crown suffering damage. A further aspect of the higher ductility of the material used for the thread insert, in comparison with the material of the cutting crown, involves the possibility of pressing the thread insert into the holding opening in the cutting crown, with the result of an improved positively locking connection, in particular of large area, between the thread insert and the cutting crown to compensate for possible manufacturing tolerances.

It can be provided that the longitudinal extent of the head portion of the thread insert is at least 30%, in particular at least 35% of the overall longitudinal extent of the thread insert.

Desirably in the cutting crown fixing according to the invention, in the installed position, the cutting crown can bear with an end face against an associated contact surface of the cutting crown holder. In that case the contact surface of the cutting crown holder can be in the form of a seat for the cutting crown, which receives the cutting crown in the region of its end facing towards the cutting crown holder and wherein the mutual contact surfaces are such that in the installed position of the components of the cutting crown fixing according to the invention relative rotation of the cutting crown relative to the cutting crown holder about the thread axis of the thread insert is prevented by the positively locking relationship. By way of example the seat afforded by the cutting crown holder can be of a wedge-shaped configuration, in which the cutting crown which is of a complementary wedge-shaped configuration at its end bears in surface contact so that rotation of the cutting crown in the installed position is prevented by bolting of the cutting crown in the cutting crown holder.

BRIEF DESCRIPTION OF THE DRAWINGS

The invention is described hereinafter by the description of an embodiments together with modifications with reference to the accompanying Figures in which.

DETAILED DESCRIPTION

Figure 1:
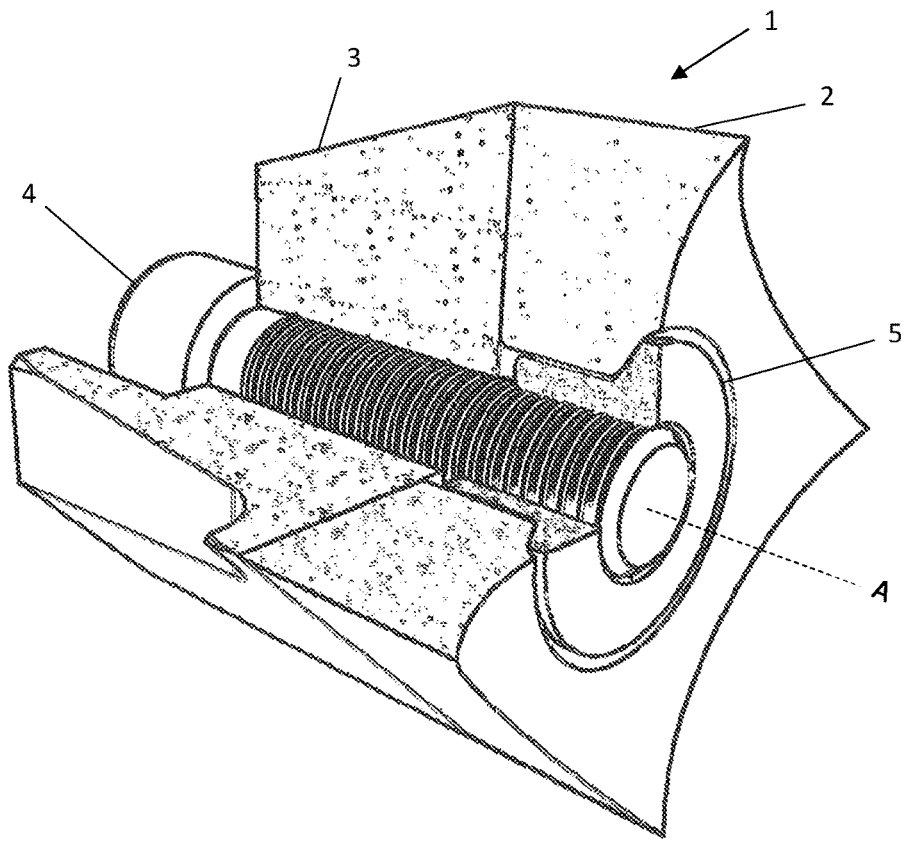
FIG. 1 shows a sectional view with two partial sections which are displaced relative to each other through 90° of an embodiment of a cutting crown fixing according to the invention as a perspective side view.

FIG. 1 shows a perspective view of a cutting crown fixing 1 according to the invention in a sectional view with two partial sections displaced through 90° relative to each other, the section line formed by two section planes extending coaxially through the axis A of a screw bolt 4. The cutting crown fixing according to the invention includes a cutting crown holder 3 to which a cutting crown 2 is fitted, wherein inserted at the end of the cutting crown, that is remote from the cutting crown holder, is a thread insert 5 which in the installed position is screwed to the screw bolt 4 for axially securing the cutting crown 2 to the cutting crown holder 3.

In the described embodiment the cutting crown holder 3 can be adapted for fixing to a comminuting rotor of a comminuting or shredding apparatus, in particular by welding. In general a multiplicity of such cutting crown fixings 1 are mounted on the comminuting rotor over the entire working width thereof and frequently peripherally displaced. By way of example such a comminuting rotor can have respective rib-like recesses into which a respective cutting crown holder 3 having contact surfaces complementary to the recess is inserted and welded to the rotor in such a way that a worn cutting crown can be replaced by releasing the described screw connection.

Figure 2:
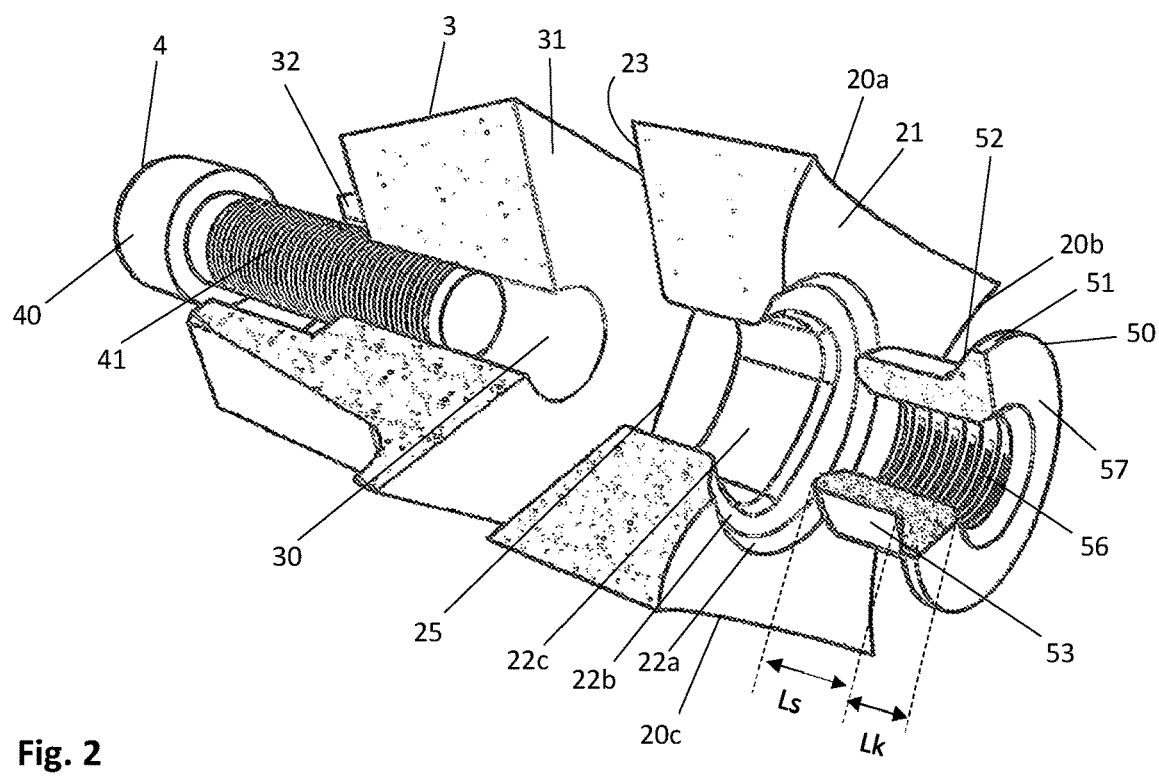
FIG. 2 shows the view of FIG. 1 as an exploded view.
Figure 3A:
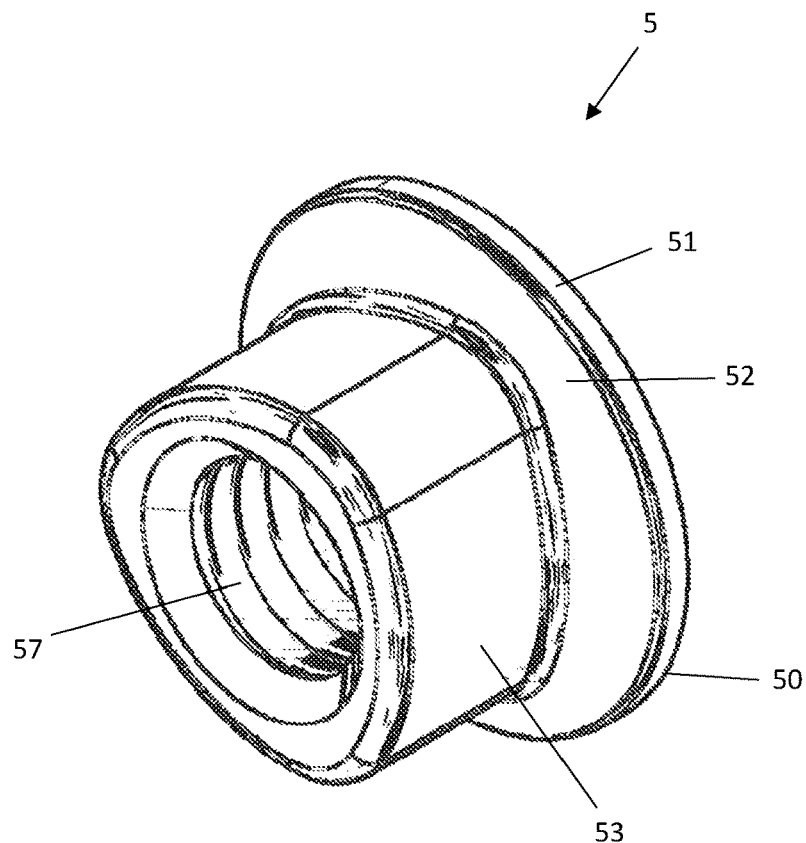
FIG. 3A shows a perspective side view looking on to the shaft of the thread insert of the cutting crown fixing of FIGS. 1 and 2.
Figure 3B:
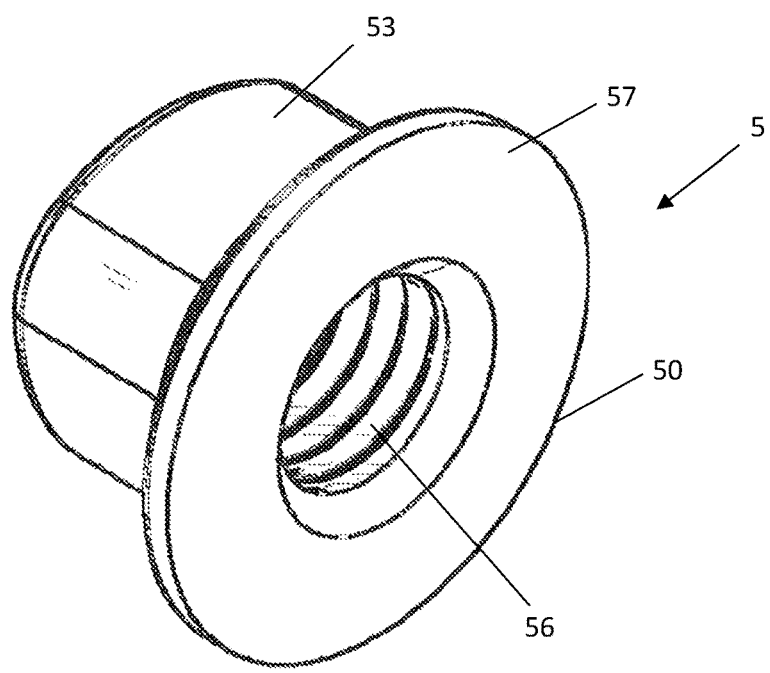
FIG. 3B shows a perspective side view of the thread insert of FIG. 3A looking on to the head of the thread insert.
Figure 3:
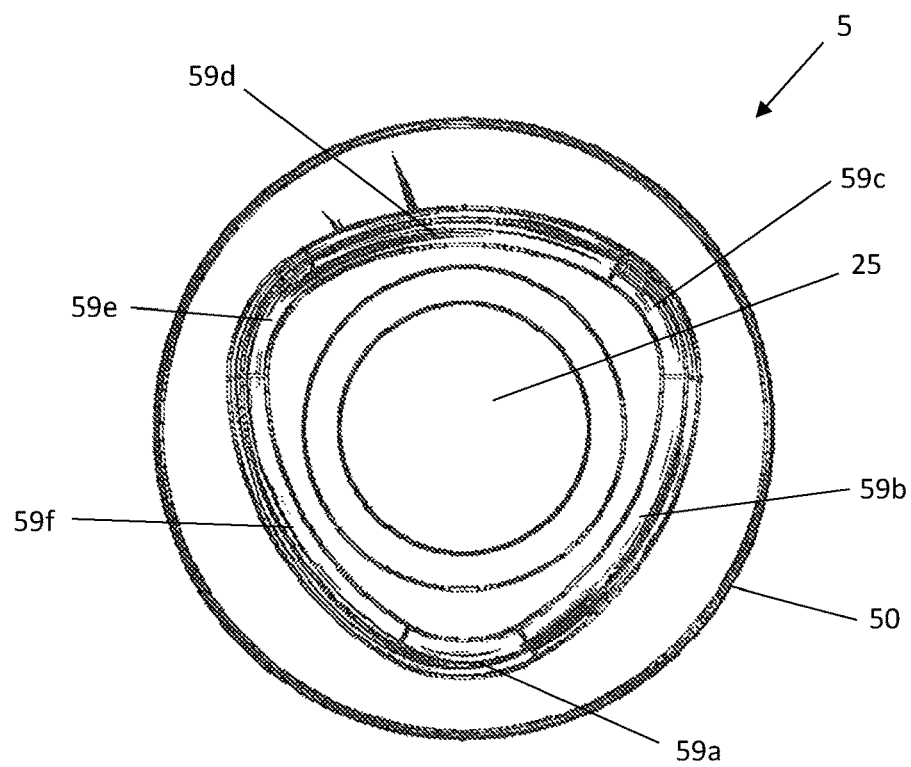
FIG. 3C shows a front view on to the thread insert of FIG. 3A looking on to the shaft.
FIG. 3D shows a side view of the thread insert of FIG. 3A.
Figure 3D:
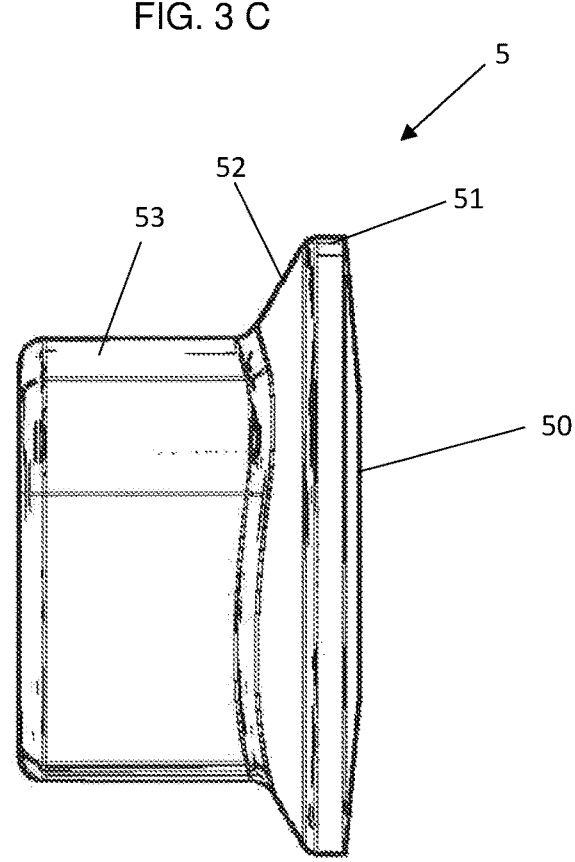

FIG. 2 shows an exploded view of the components of FIG. 1 relating to the configuration of the cutting crown fixing 1 according to the invention. At its end facing towards the cutting crown 2 the cutting crown holder 3 has a contact surface 31 which here is flat for bearing against a contact surface 23 of the cutting crown 2, that is of a complementary configuration. Between its opposite ends the cutting crown holder 3 has a passage or bore 30 through which the screw bolt 4 in the installed state extends with its bolt thread 41, wherein in the described embodiment the length of the bolt thread 41 corresponds to the sum of the length of the passage 30 in the cutting crown holder 3 and the length of the holding opening 25 in the cutting crown 2 and the holder opening 25 extends between the flat contact surface 23 and the oppositely disposed end face or surface which here represents a cutting surface 21.

In the described embodiment the holding opening 25 is in the form of a positively locking surface over its entire longitudinal extent in relation to the outside peripheral surfaces of the thread insert 5.

In the described embodiment the thread insert 5 has a thread 56 extending therethrough, of a complementary configuration to the bolt thread 41 of the screw bolt 4. The head region of the thread insert 5 with an axial extent Lk is here of a purely rotationally symmetrical configuration and, starting from the head end 57 of the thread insert 5, includes a purely cylindrical portion 51, adjoined by a cone portion 52, the axial end of which is adjoined by the shaft portion 53 over an axial extent Ls. To provide an axial positively locking relationship with the cutting crown the latter, starting from the cutting surface 21, to provide the holding opening 25, firstly has a purely cylindrical delimitation surface 22a which is adjoined by a conical delimitation surface 22b in a complementary configuration with the cone 52 of the thread insert. The shaft portion 53 of the axial length s of the thread insert 5 is of a complementary configuration to the delimitation surface 22c of the cutting crown 2, in the present case in cross-section in the form of a polygon shape with rounded corners, at which the edges of the polygon blend into each other. In the described embodiment the length of the holding opening 25 is adapted to or is identical to the overall height of the thread insert 5, that is to say the sum Ls and Lk. In the described embodiment the outer peripheral surface of the shaft 53 is of a complementary configuration to the delimitation surface 22c of the cutting crown 2 so that that longitudinal portion involves a rotational positively locking relationship between the thread insert 5 and the cutting crown 2 in the installed position. In particular it can be provided that the delimitation surface 22c of the holding opening 25 and in a complementary fashion the outer peripheral surface of the shaft 53 over the entire longitudinal extent thereof are of a substantially identical cross-section perpendicularly to the longitudinal direction so that in this described embodiment in the installed position of the components a purely axial positively locking relationship is present over the axial distance Lk and a purely torsional, that is to say rotational, positively locking relationship between the cutting crown 2 and the female thread 5 is present over the axial length Ls.

In an embodiment (not shown) it can also be provided that the radial extent of the outer peripheral surface of the shaft 53 changes in the longitudinal direction and the delimitation surface 22c also in a correspondingly complementary fashion so that in this embodiment the axial portion Ls involves both a torsional and also an axial positively locking relationship between the cutting crown 2 and the thread insert 5.

In particular the positively locking configuration of the cutting crown 2 and therewith also the configuration, complementary thereto, of the holding opening in the cutting crown can be seen in greater detail from the views in FIGS. 3a-d showing different views of the thread insert 5 of the described cutting crown fixing according to the invention. It can be seen in particular from FIG. 3c that, in the cross-section perpendicular to the axis, the outer peripheral surface of the shaft 53 in the described embodiment is composed of a multiplicity of curved surface portions 59a-f occurring in succession in the peripheral direction. As the successive peripheral surfaces are of different radii of curvature this results in a rotational positively locking relationship between those peripheral surfaces and the longitudinal portion Ls of the holding opening 25 of the cutting crown, that is of a complementary configuration to the peripheral surface of the shaft 53, see FIGS. 1 and 2.

LIST OF REFERENCES 1 cutting crown fixing
2 cutting crown
3 cutting crown holder
4 screw bolt
5 thread insert
20a,b,c cutting edge
21 cutting surface
22a,b,c delimitation surface
23 contact surface 25 holding opening
30 passage
31 contact surfaces
32 bolt head receiving means
32 bolt head
40 bolt thread
41 head
50 cylindrical portion
52 cone, conical portion
53 shaft, shaft portion
54 peripheral surface
56 thread
57 end face
59a-f peripheral surface portion of the shaft
A axis
Lk head length
Ls shaft length

What is claimed is:

1. A cutting crown fixing for positively locking and non-rotatable fixing of a cutting crown to a holder associated therewith of a comminuting apparatus, including:
   the cutting crown,
   the holder,
   a screw bolt and a thread insert having a head portion and a shaft portion,
   wherein the thread insert has a female thread complementary to a male thread of the screw bolt and the holder has a through passage for receiving the screw bolt, and in an installed position the thread insert is arranged in a positively locking relationship in axial and tangential directions in a holding opening of the cutting crown associated therewith,
   wherein the positively locking configuration of a peripheral surface of the thread insert relative to the holding opening of the associated cutting crown extends over an entire longitudinal extent of the thread insert,
   wherein the thread insert is of a rotationally symmetrical configuration over a longitudinal extent of the head portion for providing an axial positively locking relationship with the holding opening and at least over a longitudinal portion the thread insert has a conical peripheral surface which in the installed position corresponds to a conical receiving portion of complementary configuration of the holding opening and the thread insert in a region of a longitudinal extent of the shaft portion is of a non-rotationally symmetrical configuration for providing a rotational positively locking relationship with the holding opening.

2. The cutting crown fixing as set forth in claim 1, wherein the holding opening extends from a surface of the cutting crown, to a surface opposite thereto.

3. The cutting crown fixing as set forth in claim 1, wherein the head portion of the thread insert in the axial direction has a cylindrical portion which in the installed position faces towards a cutting surface of the cutting crown and which is adjoined in a coaxial orientation by the conical portion.

4. The cutting crown fixing as set forth in claim 1, wherein along the longitudinal extent of the shaft portion the thread insert has a variable spacing in respect of its peripheral surface perpendicularly to the axis of its screw thread.

5. The cutting crown fixing as set forth in claim 1, wherein in the installed position in the longitudinal extent of the shaft portion the thread insert is free of positively locking engagement in the axial direction relative to associated portions of the holding opening.

6. The cutting crown fixing as set forth in claim 1, wherein the thread insert is arranged in fixed relationship by clamping, producing a press fit, staking or glueing in the holding opening of the cutting crown.

7. The cutting crown fixing as set forth in claim 1, wherein in the installed position at a front end portion facing at least towards a cutting surface of the associated cutting crown the thread insert has an end face which continuously extends and/or supplements the at least one cutting surface of the associated cutting crown to avoid chips which are misdirected by edges.

8. The cutting crown fixing as set forth in claim 1, wherein in the installed position at a front end portion facing towards at least one cutting surface of the associated cutting crown the screw bolt has an end face which continuously extends and/or supplements an end face of the thread insert and the at least one cutting surface of the cutting crown to avoid chips which are misdirected by edges.

9. The cutting crown fixing as set forth in claim 1, wherein the female thread of the thread insert is in a form of a blind hole thread.

10. The cutting crown fixing as set forth in claim 1, wherein the thread insert and the associated cutting crown are made from mutually different materials, wherein the material of the thread insert is of higher ductility than the material of the cutting crown.

11. The cutting crown fixing as set forth in claim 1, wherein the shaft portion of the thread insert in a section transversely to the axial direction has at least a plurality of polygonal portions.

12. The cutting crown fixing as set forth in claim 1, wherein the thread insert and the associated cutting crown in the relative installed position are subjected to a heat treatment to set a predetermined final strength of the cutting crown.

13. The cutting crown fixing as set forth in claim 1, wherein the longitudinal extent of the head portion of the thread insert is at least 30% of the overall longitudinal extent of the thread insert.

* * * * *